US010516492B2

(12) United States Patent
You

(10) Patent No.: US 10,516,492 B2
(45) Date of Patent: *Dec. 24, 2019

(54) REMOTE APPARATUS OF DISTRIBUTED ANTENNA SYSTEM

(71) Applicant: SOLiD, INC., Seongnam-si, Gyeonggi-do (KR)

(72) Inventor: Youngju You, Incheon (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,591

(22) Filed: Sep. 11, 2018

(65) Prior Publication Data

US 2019/0013882 A1    Jan. 10, 2019

Related U.S. Application Data

(63) Continuation of application No. 15/501,002, filed as application No. PCT/KR2015/013251 on Dec. 4, 2015, now Pat. No. 10,090,941.

(30) Foreign Application Priority Data

Dec. 30, 2014 (KR) .......................... 10-2014-0194365

(51) Int. Cl.
| H04B 17/16 | (2015.01) |
| H04B 17/17 | (2015.01) |
| H04B 1/04  | (2006.01) |
| H03C 1/62  | (2006.01) |

(52) U.S. Cl.
CPC .......... *H04B 17/16* (2015.01); *H04B 1/0475* (2013.01); *H04B 17/17* (2015.01)

(58) Field of Classification Search
CPC .............................. H04B 1/0475; H04B 17/16

USPC ............................................... 455/114.1, 295
See application file for complete search history.

(56) References Cited

U.S. PATENT DOCUMENTS

| 8,428,033 | B2  | 4/2013  | Hettstedt et al.         |
| 10,090,941 | B2* | 10/2018 | You ................ H04B 17/16 |
| 2013/0182753 | A1 | 7/2013 | Delforce et al.          |

FOREIGN PATENT DOCUMENTS

WO    2013/040579 A1    3/2013

OTHER PUBLICATIONS

International Search Report of PCT/KR2015/013251 dated Mar. 28, 2016 [PCT/ISA/210].

(Continued)

*Primary Examiner* — Lee Nguyen
(74) *Attorney, Agent, or Firm* — Sughrue Mion, PLLC

(57) ABSTRACT

A remote apparatus includes: a plurality of sub amplification units amplifying radio frequency (RF) signals of different frequency bands, respectively; a test signal generation unit generating test signals of a frequency band for any one sub amplification unit among the plurality of sub amplification units; a conversion unit converting intermodulation (IM) signals generated in response to the test signals into a plurality of conversion IM signals by using a conversion signal of which a frequency is swept; and a control unit determining a degree of an intermodulation distortion by the any one sub amplification unit based on signal levels of the plurality of the conversion IM signals.

20 Claims, 3 Drawing Sheets

(56) References Cited

OTHER PUBLICATIONS

Office Action issued in U.S. Appl. No. 15/501,002 dated Dec. 11, 2017.
Notice of Allowance issued in U.S. Appl. No. 15/501,002 dated May 25, 2018.

* cited by examiner

REMOTE APPARATUS OF DISTRIBUTED ANTENNA SYSTEM

CROSS REFERENCE TO RELATED APPLICATIONS

This application is a continuation of U.S. patent application Ser. No. 15/501,002 filed on Feb. 1, 2017, which is a National Stage of International Application No. PCT/KR2015/013251, filed Dec. 4, 2015, and claims priority from Korean Patent Application No. 10-2014-0194365 filed Dec. 30, 2014, the contents of which are incorporated herein by reference in their entireties.

BACKGROUND

1. Field

The inventive concept relates to a remote apparatus of a distributed antenna system. More particularly, the inventive concept relates to a remote apparatus of a distributed antenna system which uses intermodulation (IM) signals converted by using a swept conversion signal to determine a degree intermodulation distortion without frequency correction of the IM signals.

2. Description of Related Art

Intermodulation represents a phenomenon in which an output frequency component harmonized by the sum and the difference between harmonic frequencies of two different input frequency signals is output during processing a radio frequency (RF) signal through a non-linear element.

The intermodulation may be called intermodulation distortion (IMD) as a distorted factor that interferes with a signal. Among the IMDs, an IMD generated from a passive element is called passive IMD (PIMD) and since the PIMD degrades a communication quality, the PIMD has been on the rise as a primary interference cause in a recent communication system.

However, most measurement apparatuses of the PIMD are expensive apparatuses and have a limit in efficiently measuring the PIMD.

SUMMARY

The inventive concept is directed to a remote apparatus of a distributed antenna system which uses intermodulation (IM) signals converted by using a swept conversion signal to determine a degree intermodulation distortion without frequency correction of the IM signals.

According to an aspect of an embodiment, there is provided a remote apparatus, includes: a plurality of sub amplification units amplifying radio frequency (RF) signals of different frequency bands, respectively; a test signal generation unit generating test signals of a frequency band for any one sub amplification unit among the plurality of sub amplification units; a conversion unit converting intermodulation (IM) signals generated in response to the test signals into a plurality of conversion IM signals by using a conversion signal of which a frequency is swept; and a control unit determining a degree of an intermodulation distortion by the any one sub amplification unit based on signal levels of the plurality of the conversion IM signals.

In an example embodiment, wherein the control unit may determine a conversion signal having the highest signal level among the plurality of conversion IM signals as a $3^{rd}$ IM signal and determine the degree of the intermodulation distortion by the any one sub amplification unit based on the signal level of the $3^{rd}$ IM signal.

In an example embodiment, wherein the control unit may determine a conversion signal having the second highest signal level among the plurality of conversion IM signals as a $5^{th}$ IM signal and determine the degree of the intermodulation distortion by the any one sub amplification unit based on the signal levels of the $3^{rd}$ IM signal ad the $5^{th}$ IM signal.

In an example embodiment, wherein the plurality of sub amplification units may be connected to each other in a cascade structure.

In an example embodiment, wherein the IM signal may be transmitted to the conversion unit through the any one sub amplification unit and at least one sub amplification unit connected to a rear end of the any one sub amplification unit.

In an example embodiment, the remote apparatus may further include a first switch unit is switched to transmit any one of a downlink signal and the test signal to a sub amplification unit at a frontmost end among the plurality of sub amplification units.

In an example embodiment, the remote apparatus may further include a second switch unit is switched to receive any one of an uplink signal and the IM signal to a sub amplification unit at a rearmost end among the plurality of sub amplification units.

In an example embodiment, the remote apparatus may further include a measurement signal extraction filter for passing only a conversion IM signal to be measured among the plurality of conversion IM signals.

In an example embodiment, the remote apparatus may further include a power measurer measuring a signal level of the conversion IM signal passed by the measurement signal extraction filter and transmitting a measured result to the control unit.

In an example embodiment, wherein the plurality of respective test signals may be continuous wave signals.

According to embodiments of the inventive concept, a remote apparatus of a distributed antenna system uses intermodulation (IM) signals converted by using a swept conversion signal to determine a degree intermodulation distortion without frequency correction of the IM signals.

Further, a passive intermodulation distortion (PIMD) measurement unit is provided in the remote apparatus and an operating mode to measure the PIMD through switching is provided to save time and cost required to measure the PIMD.

In addition, a degree of the intermodulation distortion by a specific sub amplification unit among a plurality of sub amplification units connected in a cascade structure may be selectively determined.

BRIEF DESCRIPTION OF THE FIGURES

A brief description of each drawing is provided to more sufficiently understand drawings used in the detailed description of the inventive concept.

DETAILED DESCRIPTION OF EXEMPLARY EMBODIMENTS

Figure 1:
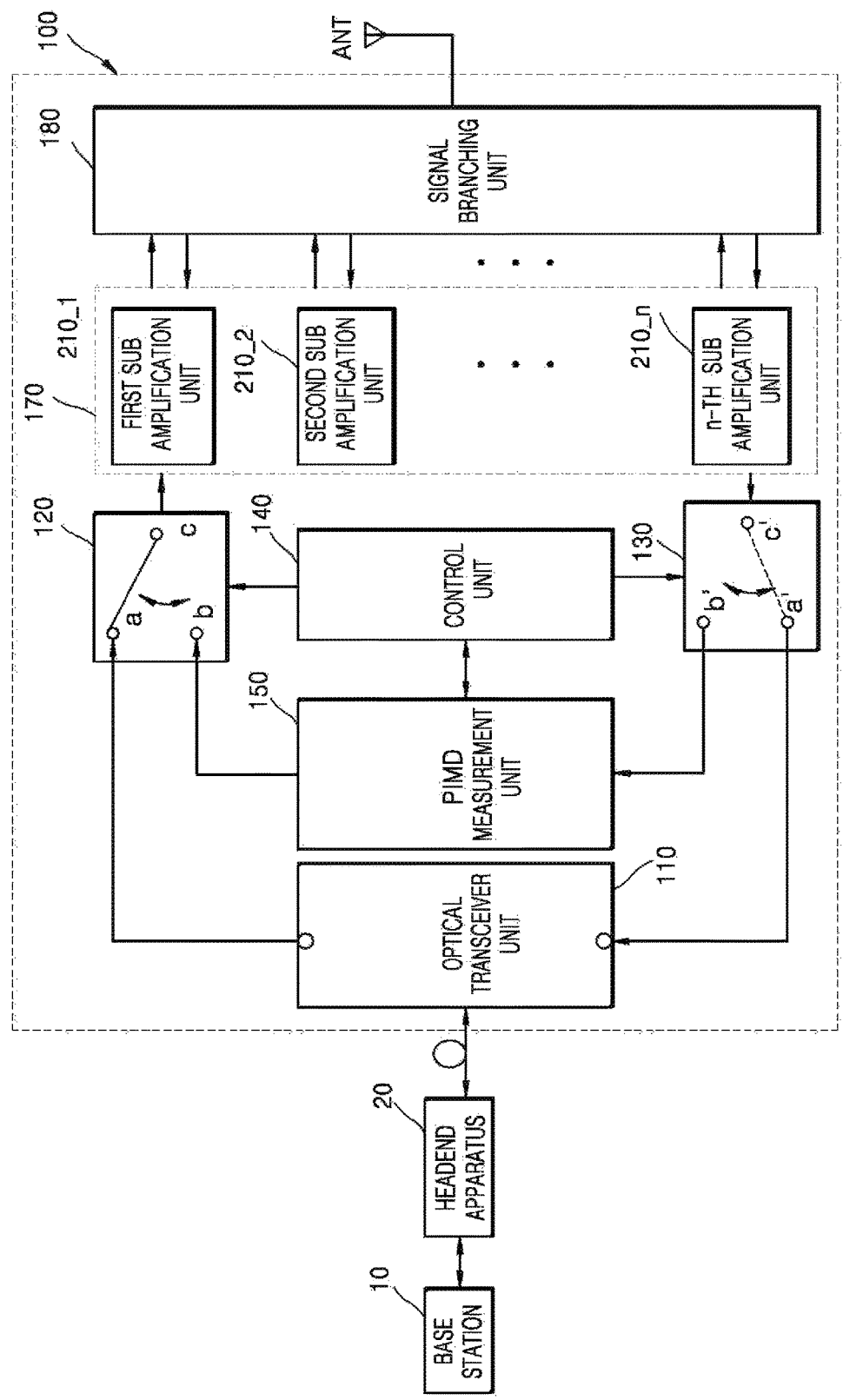
FIG. 1 is a block diagram of a remote apparatus according to an embodiment of the inventive concept.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification just are identification symbols for distinguishing one element from another element.

Further, in the specification, if it is described that one component is "connected" or "coupled" the other component, it is understood that the one component may be directly connected to or may directly coupled the other component but unless explicitly described to the contrary, another component may be "connected" or "coupled" between the components.

Further, terms including "unit", "er", "member", "module", and the like disclosed in the specification mean a unit that processes at least one function or operation and this may be implemented by hardware or software or a combination of hardware and software.

In addition, it will be apparent that in the specification, components are just classified for each main function which each component takes charge of. That is, two or more components to be described below may be provided to be combined into one component or one component may be provided to be separated into two or more for each of more subdivided functions. In addition, each of the components to be described below may additionally perform some or all functions among functions which other components take charge of in addition to the main function which each component takes charge of and some functions among the main functions which the respective take charge of may be exclusively charged and performed by other components.

Hereinafter, embodiments of the inventive concept will be sequentially described in detail.

FIG. 1 is a block diagram of a remote apparatus according to an embodiment of the inventive concept. In FIG. 1, it is illustrated that one remote apparatus 100 is communicatively coupled to a headend apparatus 20 to constitute a distributed antenna system that relays communication between a base station 10 and a user terminal (not illustrated), but the inventive concept is not limited thereto. The distributed antenna system may include a plurality of remote apparatus communicatively coupled to the headend apparatus 20 and in this case, other remote apparatuses may also have substantially the same structure as a remote apparatus 100 to be described below. Further, in FIG. 1, it is illustrated that one base station 10 is connected to the headend apparatus 20, but the inventive concept is not limited thereto and a plurality of base stations may be connected to the headend apparatus, of course.

Referring to FIG. 1, the remote apparatus 100 according to the embodiment of the inventive concept may include an optical transceiver unit 110, a first switch unit 120, a second switch unit 130, a control unit 140, a passive intermodulation distortion (PIMD) measurement unit 150, an amplification unit 170, a signal branching unit 180, and an antenna ANT.

The optical transceiver unit 110 may be connected to the headend apparatus 20 through a predetermined transport medium, for example, an optical cable and receive an optical signal from the headend apparatus 20. Herein, the optical signal is transmitted from the base station 10 and a downlink signal including a plurality of RF signals having different frequency bands may be a signal electric-to-optical converted by the headend apparatus 20.

The optical transceiver unit 110 may optical-to-electric convert the input optical signal into the downlink signal. That is, the optical transceiver unit optical-to-electric converts the optical signal to restore a base station signal which the headend apparatus 20 receives from the base station 10.

The first switch unit 120 may switch a connection state among a first terminal a connected to the optical transceiver unit 110, a second terminal b connected to the PIMD measurement unit 150, and a third terminal c connected to the amplification unit 170 according to control by the control unit 140.

In some embodiments, when the first terminal and the third terminal c of the first switch unit 120 are connected to each other, the optical transceiver unit 110 may transfer the downlink signal to the amplification unit 170.

In some embodiments, when the second terminal b and the third terminal c of the first switch unit 120 are connected to each other, the PIMD measurement unit 150 may transfer test signals to the amplification unit 170.

The second switch unit 130 may switch a connection state among a first terminal a' connected to the optical transceiver unit 110, a second terminal b' connected to the PIMD measurement unit 150, and a third terminal c' connected to the amplification unit 170 according to the control by the control unit 140.

In some embodiments, when the first terminal a' and the third terminal c' of the second switch unit 130 are connected to each other, the optical transceiver unit 110 may receive an uplink signal from the amplification unit 170.

In some embodiments, when the second terminal b' and the third terminal c' of the second switch unit 130 are connected to each other, the PIMD measurement unit 150 may receive an intermodulation (IM) signal generated in response to the test signals from the amplification unit 170.

The control unit 140 may control the overall operation of the remote apparatus 100. The control unit 140 may select any one operation mode among operation modes of the remote apparatus 100, for example, a downlink mode, an uplink mode, and a PIMD measurement mode. The control unit 140 may control the first switch unit 120 and the second switch unit 130 according to the selected operation mode.

In some embodiments, the control unit 140 may select the operation mode in response to an input of a manager. In other embodiment, the control unit 140 may select the operation mode in response to a control signal transmitted from a management server, for example, a network management system (NMS) server.

The PIMD measurement unit 150 may generate the test signals and the intermodulation (IM) signal generated in response to the test signals in order to determine the degree of the intermodulation distortion by any one among a plurality of sub amplification units 210_1 to 210_n included in the amplification unit 170. In some embodiments, the IM signal may be analyzed by the control unit 140.

A structure and an operation of the PIMD measurement unit 150 will be described in detail with reference to FIG. 2.

The amplification unit 170 may include the plurality of sub amplification units 210_1 to 210_n that amplifies corresponding RF signals among the radio frequency (RF) signals of the different frequency bands included in the downlink signal or the uplink signal, respectively. The plurality of sub amplification units 210_1 to 210_n may be connected in a cascade structure. A detailed configuration of the plurality of sub amplification units 210_1 to 210_*n* will be described below with reference to FIG. 3.

The signal branching unit 180 may combine the plurality of RF signals output from the plurality of sub amplification units 210_1 to 210_*n*, respectively. The signal branching unit 180 may transmit the plurality of combined RF signals to other external apparatuses, for example, user terminals including a cellular phone, a smart phone, a tablet PC, and the like through the antenna ANT. In some embodiments, the signal branching unit 180 may be implemented as a multiplexer (MUX).

In FIG. 1, the control unit 140 and the PIMD measurement unit 150 are illustrated with being distinguished as separate blocks, but the control unit 140 and the PIMD measurement unit 150 may be configured as one module according to an implementation example. Further, in some embodiments, the first switch unit 120 and the second switch unit 130 may be configured as one module.

Figure 2:
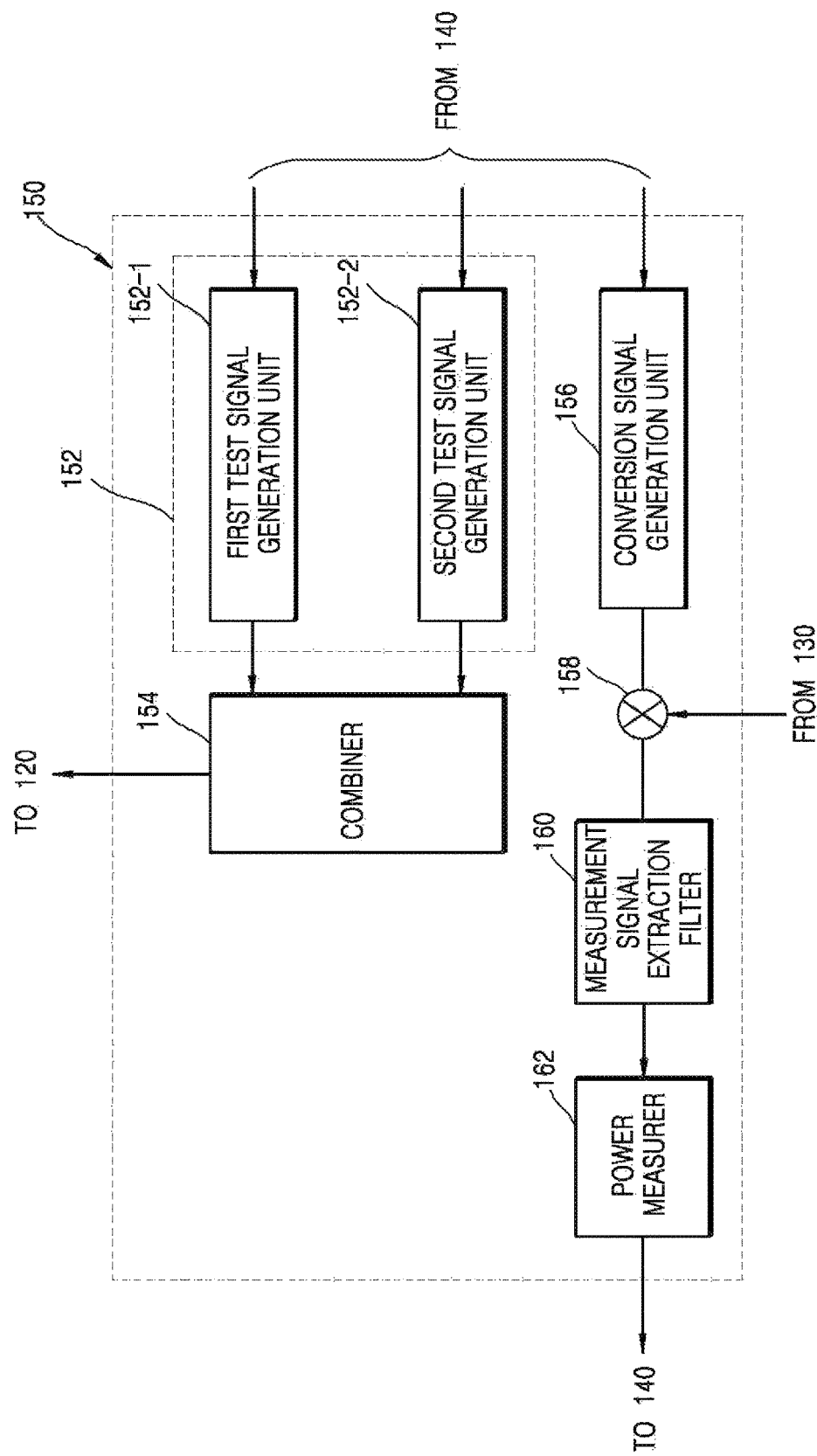
FIG. 2 is an exemplary diagram illustrating a detailed configuration of a passive intermodulation distortion (PIMD) measurement unit illustrated in FIG. 1.

FIG. 2 is an exemplary diagram illustrating a detailed configuration of a passive intermodulation distortion (PIMD) measurement unit illustrated in FIG. 1.

Referring to FIGS. 1 and 2, the PIMD measurement unit 150 may include a test signal generation unit 152, a combiner 153, a conversion signal generation unit 156, a conversion unit 158, a measurement signal extraction filter 160, and a power detector 162.

The test signal generation unit 152 may generate test signals of a frequency band for any one sub amplification unit among the plurality of sub amplification units 210_1 to 210_*n* included in the amplification unit 170 according to the control by the control unit 140. In this case, a first test signal generation unit 152-1 may generate a first test signal and a second test signal generation unit 152_2 may generate a second test signal. In some embodiments, a plurality of respective test signals may be continuous wave signals.

Hereinafter, a case will be assumed and described, in which the test signal generation unit 152 generates test signals of a frequency band for a second sub amplification unit 210_2 among the plurality of sub amplification units 210_1 to 210_*n*.

The combiner 154 combines a first signal and a second signal generated by the test signal generation unit 152 to transmit the combined signals to the first switch unit 120.

The first switch unit 120 may connect the second terminal b and the third terminal c to each other in a PIMD measurement mode and transmit the test signals combined by the combiner 154 to a first sub amplification unit 210_1 at a foremost end among the plurality of sub amplification units 210_1 to 210_*n*. The test signals transmitted to the first sub amplification unit 210_1 at the foremost end are divided into the sub amplification units 210_2 to 210_*n* connected to a rear end of the first sub amplification unit 210_1 to be transferred.

A detailed transmission path of the test signals will be described below with reference to FIG. 3.

In this case, the test signals is amplified by the second sub amplification unit 210_2 to be transmitted to the antenna ANT through the signal branching unit 180. Therefore, the intermodulation (IM) signal may be generated as a reflection wave form. The generated IM signal may be transferred to the second sub amplification unit 210_2 from the antenna ANT through the signal branching unit 180. The IM signal may be transmitted to the second switch unit 130 through the second sub amplification unit 210_2 and at least one sub amplification unit 210_3 to 210_*n* connected to the rear end of the second sub amplification unit 210_2.

The second switch unit 130 may connect the second terminal b' and the third terminal c' to each other in the PIMD measurement mode and transmit the received IM signal to the conversion unit 158 of the PIMD measurement unit 150.

The conversion signal generation unit 156 may transmit the conversion signal of which the frequency is swept under the control by the control unit 140 to the conversion unit 158.

The conversion unit 158 may convert the IM signal transmitted through the second switch unit 130 into a plurality of conversion IM signals by using the frequency-swept conversion signal. The plurality of conversion IM signals converted by the conversion unit 158 may mean 3rd to n-th IM signals, respectively. In some embodiments, the conversion unit 158 may be implemented as a mixer.

The measurement signal extraction filter 160 may pass a conversion IM signal to be measured of a signal level among the plurality of conversion IM signals. In some embodiments, the measurement signal extraction filter 160 may be implemented as a band pass filter.

The power measurer 162 may measure the signal level of the conversion IM signal passed by the measurement signal extraction filter 160 and transmit a measured result to the control unit 140.

The control unit 140 may determine the degree of the intermodulation distortion by the second sub amplification unit 210_2 based on the signal levels of the plurality of conversion IM signals. In some embodiments, the control unit 140 may determine a conversion signal having the highest signal level among the plurality of conversion IM signals as the 3rd IM signal and determine the degree of the intermodulation distortion by the second sub amplification unit 210_2 based on the signal level of the 3rd IM signal. In other embodiment, the control unit 140 may determine a conversion signal having the second highest signal level among the plurality of conversion IM signals as the 5th IM signal and determine the degree of the intermodulation distortion by the second sub amplification unit 210_2 based on the signal level of the 3rd IM signal and the signal level of the 5th IM signal.

Hereinabove, the case is described as an example, in which the degree of the intermodulation distortion by the second sub amplification unit 210_2 is determined, but the technical scope of the inventive concept is not limited thereto.

Figure 3:
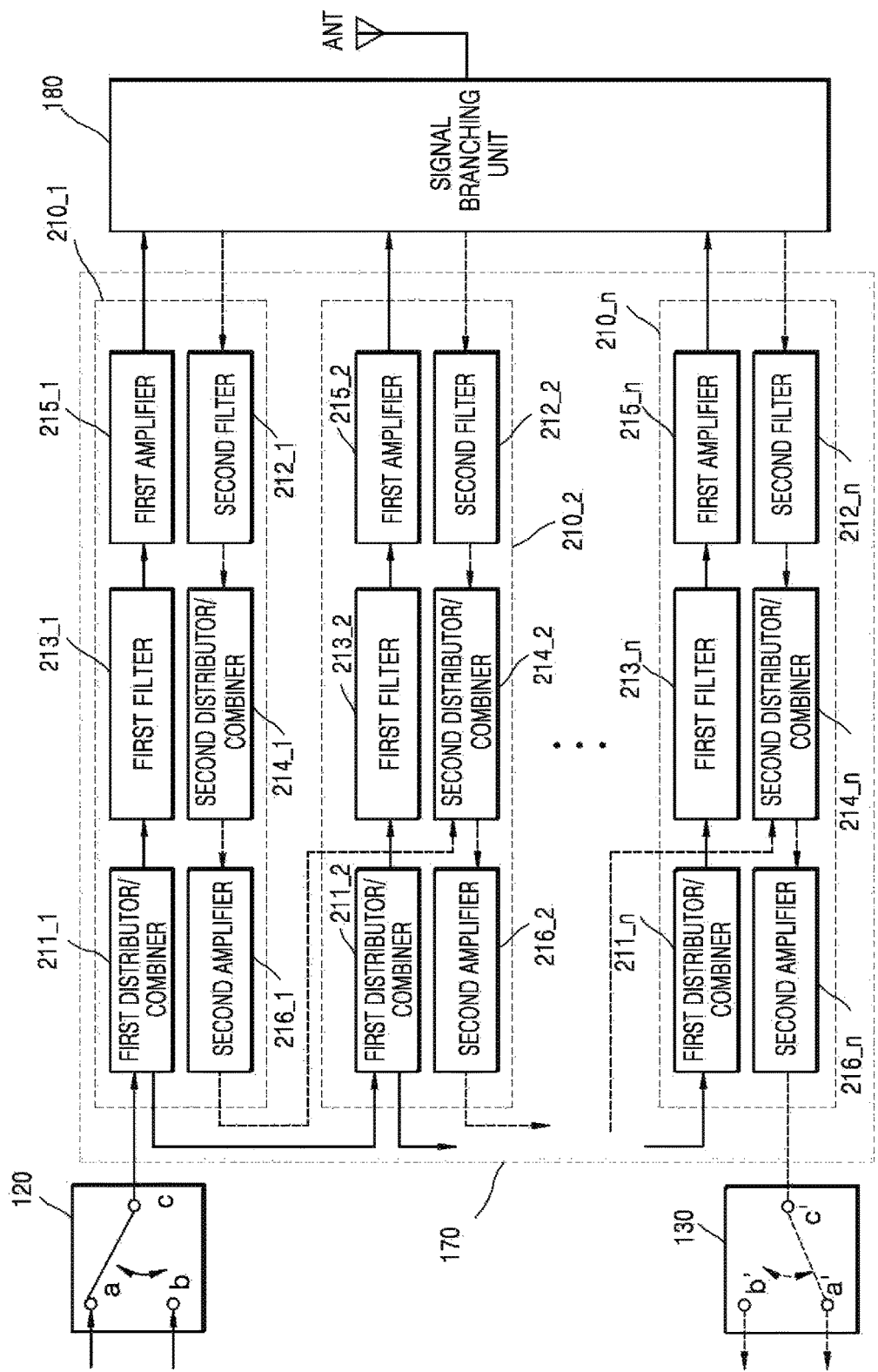
FIG. 3 is an exemplary diagram illustrating a detailed configuration of an amplification unit illustrated in FIG. 1.

FIG. 3 is an exemplary diagram illustrating a detailed configuration of an amplification unit illustrated in FIG. 1. In FIG. 3, the first switch unit 120, the second switch unit 130, the signal branching unit 180, and the antenna ANT are together illustrated for convenience of explanation.

Referring to FIGS. 1 to 3, each of the sub amplification units 210_1 to 210_*n* may include a first distributor/combiner 211, a first filter 213, and a first amplification unit 215.

First distributor/combiners 211_1 to 211_*n* may divide the test signals transmitted from the first switch unit 120 and transfers the divided test signals to the sub amplification units connected to rear ends thereof.

For example, the first distributor/combiner 211_1 of the first sub amplification unit 210_1 may divide and transfer the input test signals to the first distributor/combiner 211_2 of the second sub amplification unit 210_2 and the first distributor/combiner 211_2 of the second sub amplification unit 210_2 may divide and transfer the received test signals to the first distributor/combiner (not illustrated) of the third sub amplification unit (not illustrated).

Meanwhile, although not illustrated in FIG. 3, each of the first distributors/combiners 211_1 to 211_n may include an amplifier and compensate for loss depending on the division of the test signals by using the amplifier. According to the implementation example, the amplifier may be implemented as a module apart from the corresponding first distributor/combiner among the first distributors/combiners 211_1 to 211_n.

First filters 213_1 to 213_n may pass RF signals of corresponding frequency bands among a plurality of frequency bands. The first filters 213_1 to 213_n may have different pass bands.

Since the test signals correspond to the frequency band of any one sub amplification unit among the plurality of sub amplification units 210_1 to 210_n, all of the test signals may be interrupted in the filters of the sub amplification units other than the any one sub amplification unit. For example, when the frequency of the test signals corresponds to the frequency band of the second sub amplification unit 210_2, all of the test signals are interrupted in the first filters 213_1 and 213_3 to 213_n of the residual sub amplification units 210_1 and 210_3 to 210_n.

The first filters 215_1 to 215_n may amplify the test signals passing through the first filter. First amplifiers 215_1 to 215_n may high power amplifiers. The first amplifiers 215_1 to 215_n may transfer the amplified test signals to the signal branching unit 180.

For example, when the frequency of the test signals corresponds to the frequency band of the second sub amplification unit 210_2, the test signals passing through the first filter 213_2 of the second sub amplification unit 210_2 are amplified by the first amplifier 215_2 and transmitted to the antenna ANT through the signal branching unit 180. Therefore, the intermodulation (IM) signal may be generated as the reflection wave form. The generated IM signal may be transferred to the second sub amplification unit 210_2 from the antenna ANT through the signal branching unit 180. The IM signal may be transmitted to the second switch unit 130 through the second sub amplification unit 210_2 and at least one sub amplification unit 210_3 to 210_n connected to the rear end of the second sub amplification unit 210_2.

Each of the sub amplification units 210_1 to 210_n illustrated in FIG. 3 may include a second filter 212, a second distributor/combiner 214, and a second amplifier 216.

Second filters 212_1 to 212_n may filter input signals and transmit the filtered signals to corresponding distributors/combiners among second distributors/combiners 214_1 to 214_n.

The second distributors/combiners 214_1 to 214_n may combine and output the signal output from the corresponding second filter among the second filters 212_1 to 212_n and a signal transferred from a sub amplification unit connected to a front end thereof, in detail the second amplifier of the sub amplification unit connected to the front end thereof. Since the second distributor/combiner 214_1 of the first sub amplification unit 210_1 does not include the sub amplification unit connected to the front end thereof, the second distributor/combiner 214_1 will transfer only the signal output from the second filter 212_1 to a second amplifier 216_1. The second distributor/combiner 214_2 of the second sub amplification unit 210_2 will combine the signal output from the second amplifier 216_1 of the first sub amplification unit 210_1 connected to the front end thereof and the signal output from the second filter 212_2 and transfer the combined signals to the second amplifier 216_1. Further, the second distributor/combiner 214_n of the n-th sub amplification unit 210_n combines a signal transferred from the n−1-th sub amplification unit connected to the front end thereof and the signal output from the second filter 212_n and transfers the combined signals to the second amplifier 216_n.

Meanwhile, although not illustrated in FIG. 3, each of the second distributors/combiners 214_1 to 214_n may include the amplifier and compensate for loss depending on the combination of the signal transferred from the sub amplification unit connected to the front end and the signal transferred from the corresponding second filter by using the amplifier. Further, each of the second distributors 214_1 to 214_n may include an attenuator and control a gain of the signal transferred from the sub amplification unit connected to the front end thereof by using the attenuator. According to the implementation example, the amplifier and/or the attenuator may be implemented as a module apart from the corresponding second distributor/combiner among the second distributors/combiners 214_1 to 214_n.

Second amplifiers 216_1 to 216_n may amplify a signal output from the corresponding second distributor/combiner among the second distributors/combiners 214_1 to 214_n. The second amplifiers 216_1 to 216_n may high power amplifiers. The second amplifiers 216_1 to 216_n may transfer the amplified signal to the sub amplification unit connected to the rear end thereof and the second amplifier 216_n may transfer the amplified RF signal to the third terminal c' of the second switch unit 130.

The second amplifier 216_1 of the first sub amplification unit 210_1 will transfer the amplified RF signal to the second distributor/combiner 214_2 of the second sub amplification unit 210_2. The second amplifier 216_2 of the second sub amplification unit 210_2 will transfer the amplified RF signal to the second distributor/combiner 214_3 of the third sub amplification unit 210_3 connected to the rear end thereof. As the signals amplified by the sub amplification units at the front end are sequentially combined in the sub amplification units at the rear end and thereafter, transferred up to the n-th sub amplification unit 210_n connected to the rearmost end, the n_th sub amplification unit 210_n amplifies the signal output from the second distributor/combiner 214_n to restore the amplified signal to the signal and transfer the restored signal to the input terminal c' of the second switch unit 170.

Meanwhile, although not illustrated in FIG. 3, each of the sub amplification units 210_1 to 210_n may further include an amplifier that amplifies the signal input from the signal branching unit 180 and transfers the amplified signal to the corresponding second filter. In this case, the amplifier may be a low-noise amplifier.

For example, when the frequency of the test signals corresponds to the frequency band of the second sub amplification unit 210_2, as a feed-back path of the IM signal generated in the reflection signal form, the IM signal passes through paths such as the second filter 212_2, the second distributor/combiner 214_2, and the second amplifier 216_2 of the second sub amplification unit 210_2 and the second distributor/combiner 214_3 and the second amplifier 216_3 of the third sub amplification unit 210_3 from the antenna ANT through the signal branching unit 180 and finally, the IM signal may be transmitted to the third terminal c' of the second switch unit 130 through the second distributor/combiner 214_n and the second amplifier 216_n of the n-th sub amplification unit 210_n.

Hereinabove, the inventive concept has been described in detail with reference to a preferred embodiment, but the inventive concept is not limited to the embodiment and various modifications and changes can be made by those skilled in the art within the scope of the inventive concept.

The invention claimed is:

1. A sub-system of a distributed antenna system comprising:
   a plurality of sub amplifiers amplifying radio frequency (RF) signals of different frequency bands, respectively;
   a test signal generator generating at least one test signal for testing at least one sub amplifier from among the plurality of sub amplifiers, wherein the at least one test signal has a frequency band corresponding to the at least one sub amplifier;
   a converter converting intermodulation (IM) signals into a plurality of conversion IM signals by using a conversion signal of which a frequency is swept, wherein the IM signals are transmitted from the at least one sub amplifier in response to the at least one test signal; and
   a controller determining a degree of an intermodulation distortion by the at least one sub amplifier based on signal levels of the plurality of the conversion IM signals.

2. The sub-system of claim 1, wherein the controller determines a conversion signal having a highest signal level among the plurality of conversion IM signals as a 3rd IM signal and determines the degree of the intermodulation distortion by the at least one sub amplifier based on a signal level of the 3rd IM signal.

3. The sub-system of claim 2, wherein the controller determines a conversion signal having the second highest signal level among the plurality of conversion IM signals as a 5th IM signal and determines the degree of the intermodulation distortion by the at least one sub amplifier based on signal levels of the 3rd IM signal and the 5th IM signal.

4. The sub-system of claim 1, wherein the plurality of sub amplifiers are connected to each other in a cascade structure.

5. The sub-system of claim 4, wherein the IM signals are transmitted to the converter through the at least one sub amplifier and at least one other sub amplifier connected to a rear end of the at least one sub amplifier.

6. The sub-system of claim 1, further comprising:
   a first switch configured to transmit any one of a downlink signal and the at least one test signal to a sub amplifier at a frontmost end among the plurality of sub amplifiers.

7. The sub-system of claim 1, further comprising:
   a second switch configured to receive any one of an uplink signal and the IM signal from a sub amplifier at a rearmost end among the plurality of sub amplifiers.

8. The sub-system of claim 1, further comprising:
   a measurement signal extraction filter for passing only a conversion IM signal to be measured among the plurality of conversion IM signals.

9. The sub-system of claim 8, further comprising:
   a power measurer measuring a signal level of the conversion IM signal passed by the measurement signal extraction filter and transmitting a measured result to the controller.

10. The sub-system of claim 1, wherein the at least one test signal is a continuous wave signal.

11. A method for operating of a distributed antenna system comprising:
    generating at least one test signal for testing at least one sub amplifier from among a plurality of sub amplifiers of the distributed antenna system, wherein the at least one test signal has a frequency band corresponding to the at least one sub amplifier;
    converting intermodulation (IM) signals into a plurality of conversion IM signals by using a conversion signal of which a frequency is swept, wherein the IM signals are transmitted from the at least one sub amplifier in response to the at least one test signal; and
    determining a degree of an intermodulation distortion by the at least one sub amplifier based on signal levels of the plurality of the conversion IM signals.

12. The method of claim 11, wherein the determining a degree of an intermodulation distortion comprises:
    determining a conversion signal having a highest signal level among the plurality of conversion IM signals as a 3rd IM signal; and
    determining the degree of the intermodulation distortion by the at least one sub amplifier based on a signal level of the 3rd IM signal.

13. The method of claim 12, wherein the determining a degree of an intermodulation distortion comprises:
    determining a conversion signal having the second highest signal level among the plurality of conversion IM signals as a 5th IM signal; and
    determining the degree of the intermodulation distortion by the at least one sub amplifier based on signal levels of the 3rd IM signal and the 5th IM signal.

14. The method of claim 11, wherein the plurality of sub amplifiers are connected to each other in a cascade structure.

15. The method of claim 14, wherein the IM signals are transmitted to the converter through the at least one sub amplifier and at least one other sub amplifier connected to a rear end of the at least one sub amplifier.

16. The method of claim 11, further comprising:
    transmitting any one of a downlink signal and the at least one test signal to a sub amplifier at a frontmost end among the plurality of sub amplifiers.

17. The method of claim 11, further comprising:
    receiving any one of an uplink signal and the IM signal from a sub amplifier at a rearmost end among the plurality of sub amplifiers.

18. The method of claim 11, further comprising:
    passing only a conversion IM signal to be measured among the plurality of conversion IM signals.

19. The method of claim 18, further comprising:
    measuring a signal level of the conversion IM signal passed.

20. The method of claim 11, wherein the at least one test signal is a continuous wave signal.

* * * * *